(12) United States Patent
Tanaka et al.

(10) Patent No.: US 8,767,348 B1
(45) Date of Patent: Jul. 1, 2014

(54) THERMALLY-ASSISTED MAGNETIC RECORDING HEAD INCLUDING FIRST AND SECOND CLADDING SECTIONS HAVING DIFFERENT CHARACTERISTICS

(71) Applicant: TDK Corporation, Tokyo (JP)

(72) Inventors: Kosuke Tanaka, Tokyo (JP); Susumu Aoki, Tokyo (JP); Keita Kawamori, Tokyo (JP); Hiroki Kawato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/789,086

(22) Filed: Mar. 7, 2013

(51) Int. Cl.
*G11B 5/187* (2006.01)
*G11B 7/135* (2012.01)
*G11B 11/10* (2006.01)

(52) U.S. Cl.
USPC .................................. 360/125.31; 360/125.3

(58) Field of Classification Search
USPC ............... 360/125.3, 125.31, 125.32, 125.71, 360/125.74
See application file for complete search history.

(56) References Cited

U.S. PATENT DOCUMENTS

| | | | |
|---|---|---|---|
| 7,330,404 B2 | 2/2008 | Peng et al. | |
| 8,040,761 B2 | 10/2011 | Kawamori et al. | |
| 8,089,831 B2 | 1/2012 | Chou et al. | |
| 8,245,215 B2 * | 8/2012 | Extra | 717/168 |
| 8,493,821 B1 * | 7/2013 | Sasaki et al. | 369/13.33 |
| 8,509,038 B1 * | 8/2013 | Sasaki et al. | 369/13.33 |
| 8,619,517 B1 * | 12/2013 | Sasaki et al. | 369/13.33 |
| 8,675,457 B1 * | 3/2014 | Hirata et al. | 369/13.33 |
| 2011/0002199 A1 * | 1/2011 | Takayama et al. | 369/13.24 |
| 2012/0026846 A1 * | 2/2012 | Komura et al. | 369/13.33 |
| 2012/0188859 A1 * | 7/2012 | Hara et al. | 369/13.33 |
| 2013/0107681 A1 * | 5/2013 | Sasaki et al. | 369/13.33 |
| 2013/0250742 A1 * | 9/2013 | Komura et al. | 369/13.32 |
| 2014/0050058 A1 * | 2/2014 | Zou et al. | 369/13.33 |

FOREIGN PATENT DOCUMENTS

| | | |
|---|---|---|
| JP | B2-4104584 | 4/2008 |
| JP | A-2009-70554 | 4/2009 |
| JP | A-2011-8899 | 1/2011 |

OTHER PUBLICATIONS

U.S. Appl. No. 13/316,989, filed Dec. 12, 2011 in the name of Xuhui Jin et al.

* cited by examiner

*Primary Examiner* — Jefferson Evans
(74) *Attorney, Agent, or Firm* — Oliff PLC

(57) ABSTRACT

The thermally-assisted magnetic recording head of the invention includes: a waveguide; a magnetic pole; a cladding layer provided between the waveguide and the magnetic pole; and a plasmon generator embedded in the cladding layer. The cladding layer includes a first cladding section located on a side close to an air-bearing surface and a second cladding section located on a side far from the air-bearing surface, and a thermal expansion coefficient of the first cladding section is larger than a thermal expansion coefficient of the second cladding section.

10 Claims, 6 Drawing Sheets

THERMALLY-ASSISTED MAGNETIC RECORDING HEAD INCLUDING FIRST AND SECOND CLADDING SECTIONS HAVING DIFFERENT CHARACTERISTICS

BACKGROUND OF THE INVENTION

1. Field of the Invention

The invention relates to a thermally-assisted magnetic recording head in which near-field light is applied to a magnetic recording medium to lower a coercivity thereof so as to record information, and to a head gimbal assembly, a head arm assembly, and a magnetic recording unit that each include the thermally-assisted magnetic recording head.

2. Description of Related Art

In the past, a magnetic recording unit such as a Hard Disk Drive (HDD) has been used for recording and reproducing magnetic information (hereinafter, simply referred to as "information").

The magnetic recording unit typically includes, in the housing thereof, a magnetic recording medium (a magnetic disk) in which information is recorded, and a magnetic read write head that performs write operation and read operation of the information. The magnetic read write head is formed on a surface of a magnetic head slider, and has an air-bearing surface facing the magnetic disk. The magnetic head slider is attached to an end of a suspension, and the other end of the suspension is attached to a pivotable arm.

In recent years, along with a progress in higher recording density (higher capacity) of the magnetic disk, improvement in performance of the magnetic read write head has been demanded. Therefore, as a magnetic recording system capable of addressing higher recording density, a so-called thermally-assisted magnetic recording system has been studied. In the thermally-assisted magnetic recording system, a magnetic disk in which coercivity of a magnetic recording layer is large is used, and a magnetic field for recording (recording magnetic field) and heat are applied to a recording region (a region in which information is recorded) of the magnetic recording layer at the time of information recording. Therefore, coercivity of the recording region is lowered with increase in temperature as well as the recording region is magnetized, and thus information is recorded.

In the thermally-assisted magnetic recording system, near-field light is generally used for supplying heat to a magnetic disk. Along with this, a magnetic recording head of the thermally-assisted magnetic recording system (a thermally-assisted magnetic recording head) includes a light source generating laser light, a waveguide allowing the laser light to propagate therethrough, a magnetic pole generating a recording magnetic field, a plasmon generator provided in a region between the waveguide and the magnetic pole, and a cladding layer allowing the plasmon generator to be embedded in the region between the waveguide and the magnetic pole. In the thermally-assisted magnetic recording head, when surface plasmons are generated by the plasmon generator, near-field light is generated in the vicinity of the air-bearing surface by using the surface plasmons, and therefore heat is supplied together with the recording magnetic field to the magnetic disk.

In the case where such near-field light is used, in Japanese Patent No. 4104584, surface plasmon polariton coupling is used to prevent overheating of a plasmon generator due to direct application of light. In this case, the light propagating through a waveguide (guided light) is not directly applied to the plasmon generator, and the guided light is coupled with the plasmon generator through evanescent coupling, and thus surface plasmon polaritons are generated on a surface of the plasmon generator.

In the case where such surface plasmon polaritons are used, in U.S. Pat. No. 8,089,831, to concentrate the guided light effectively, a width of a plasmon generator is decreased in the vicinity of an air-bearing surface. Specifically, the plasmon generator includes a forward section having a uniform width and a backward section having a width larger than the uniform width, in order backward from the air-bearing surface.

During operation of the thermally-assisted magnetic recording head, since temperature is drastically increased in the vicinity of the air-bearing surface where the near-field light is generated, thermal expansion occur. As a result, large stress is applied to the plasmon generator, and thus the plasmon generator is easily agglomerated (shrunk). In this case, in particular, the forward section close to the air-bearing surface is likely to be increased in temperature as compared with the backward section, and the forward section having a volume relatively smaller than that of the backward section is easily exposed to high pressure environment, and therefore the forward section is more easily agglomerated.

If the forward section is agglomerated, the plasmon generator gets away from the magnetic disk at the time of recording, and therefore the near-field light is less likely to be generated in the vicinity of the air bearing surface. As a result, since it is difficult to control the coercivity of the magnetic disk, recording performance is deteriorated.

To prevent deterioration of the recording performance caused by the agglomeration, in Japanese Unexamined Patent Application Publication No. 2011-008899, an adhesive layer is provided between a plasmon generator and a dielectric body. In a forward section having a small volume, however, a surface area (an area contacted to the adhesive layer) thereof is also small, and thus it is difficult to suppress agglomeration of the forward section only by providing the adhesive layer.

Accordingly, it is desirable to provide a technique capable of suppressing agglomeration of a plasmon generator in order to obtain superior recording performance.

SUMMARY OF THE INVENTION

A thermally-assisted magnetic recording head according to an embodiment of the invention includes: a waveguide; a magnetic pole; a cladding layer provided between the waveguide and the magnetic pole; and a plasmon generator embedded in the cladding layer. The cladding layer includes a first cladding section located on a side close to an air-bearing surface and a second cladding section located on a side far from the air-bearing surface, and a thermal expansion coefficient of the first cladding section is larger than a thermal expansion coefficient of the second cladding section.

A head gimbal assembly, a head arm assembly, and a magnetic recording unit according to respective embodiments of the invention each include the above-described thermally-assisted magnetic recording head.

In the thermally-assisted magnetic recording head, the head gimbal assembly, the head arm assembly, and the magnetic recording unit according to the respective embodiments of the invention, out of the cladding layer allowing the plasmon generator to be embedded therein, the first cladding section located on the side close to the air-bearing surface has the thermal expansion coefficient larger than the thermal expansion coefficient of the second cladding section located on the side far from the air-bearing surface. In this case, at the time of recording, even if thermal expansion occurs in the vicinity of the air-bearing surface due to high temperature, stress is less likely to be applied to a forward section of the plasmon generator. Accordingly, since the forward section of the plasmon generator is less likely to be agglomerated, superior recording performance is obtainable.

DETAILED DESCRIPTION OF THE PREFERRED EMBODIMENTS

Hereinafter, a preferred embodiment of the invention will be described in the following order with reference to drawings.
1. Configuration of Magnetic Recording Unit
2. Structure of Magnetic Read Write Head
3. Structure of Light Source Unit
4. Structure of Main Part of Magnetic Read Write Head
5. Circuit Configuration and Operation of Magnetic Recording Unit
6. Generation Principle of Near-Field Light and Recording Principle of Thermally-Assisted Magnetic Recording
7. Function and Effects
[1. Configuration of Magnetic Recording Unit]

Figure 1:
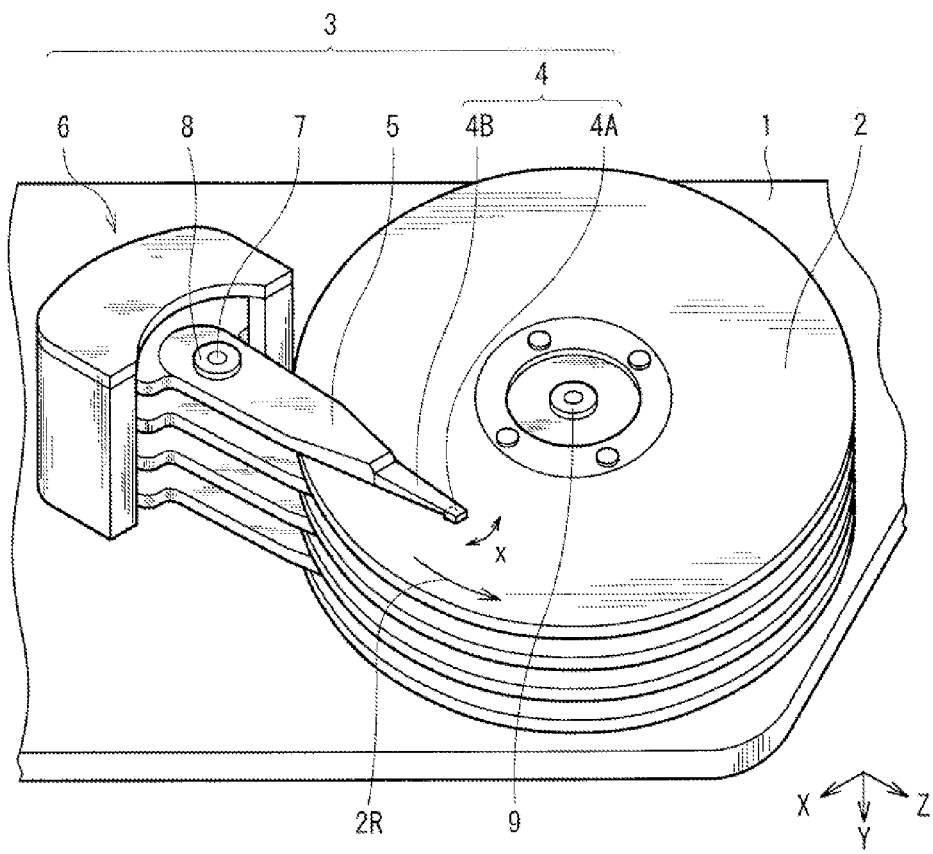
FIG. 1 is a perspective view illustrating a configuration of a magnetic recording unit using a thermally-assisted magnetic recording head according to an embodiment of the invention.
Figure 2:
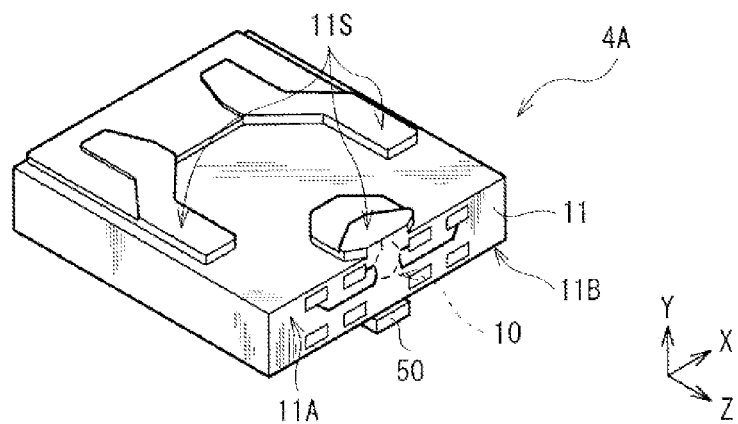
FIG. 2 is a perspective view illustrating a magnetic head slider illustrated in FIG. 1 in an enlarged manner.

First, referring to FIG. 1 and FIG. 2, a configuration of a magnetic recording unit using a thermally-assisted magnetic recording head according to an embodiment of the invention will be described. FIG. 1 illustrates a perspective configuration of the magnetic recording unit, and FIG. 2 illustrates a perspective configuration of a magnetic head slider 4A illustrated in FIG. 1 in an enlarged manner.

The magnetic recording unit described here adopts, for example, a load-unload system as a driving system. For example, as illustrated in FIG. 1, the magnetic recording unit includes, in a housing 1, one or more magnetic disk 2 in which information is to be recorded, a Head Arm Assembly (HAA) 3 executing recording processing and reading processing of the information, and a control circuit for operation control (not illustrated). Note that, in FIG. 1, for example, a case where four magnetic disks 2 are used is exemplified.

The HAA 3 includes a Head Gimbal Assembly (HGA) 4, an arm 5 supporting the HGA 4, and a driver 6 for allowing the arm 5 to pivot.

The HGA 4 includes a magnetic head slider 4A having a side surface provided with a magnetic read write head 10 described later and a suspension 4B having an end (a first end) attached with the magnetic head slider 4A. The other end (a second end) of the suspension 4B, namely, an end opposite to the end (an end) attached with the magnetic head slider 4A is supported by the arm 5. The arm 5 is pivotable, through a bearing 8, around a fixed shaft 7 fixed to the housing 1. The driver 6 as a power source includes, for example, a voice coil motor.

The magnetic head slider 4A is disposed corresponding to recording surfaces (a front surface and a back surface) of each of the magnetic disks 2. Each of the magnetic head sliders 4A is movable in a direction across recording tracks, that is, in a track width direction (in an X-axis direction) in a plane parallel to the recording surface of each of the magnetic disks 2. On the other hand, the magnetic disk 2 is rotatable around a spindle motor 9 fixed to the housing 1 in a direction (a rotation direction 2R) substantially orthogonal to the X-axis direction. With the rotation of the magnetic disk 2 and the movement of the magnetic head slider 4A to the recording surface of the magnetic disk 2, information is recorded into the magnetic disk 2 as well as information recorded in the magnetic disk 2 is read out.

The control circuit controls a recording operation and a reading operation of the magnetic read write head 10. The control circuit also controls an emission operation of a light source (a laser diode) used for thermally-assisted magnetic recording described later.

For example, as illustrated in FIG. 2, the magnetic head slider 4A has a block-shaped slider 11 formed of AlTiC ($Al_2O_3 \cdot TiC$) or the like. The shape of the slider 11 is substantially hexahedron, for example, and one surface out of six surfaces corresponds to an Air-Bearing Surface (ABS) 11S that faces the recording surface of the magnetic disk 2.

When the magnetic recording unit is not driven and the magnetic disk 2 does not rotate, the magnetic head slider 4A is pulled off to the position away from the recording surface of the magnetic disk 2 (unload state), in order to avoid contact of the ABS 11S and the recording surface. In contrast, when the magnetic recording unit is operated and the magnetic disk 2 rotates, the arm 5 is pivotably moved by the driver 6, and therefore, the magnetic head slider 4A moves above the recording surface of the magnetic disk 2 (load state). At this time, the rotation of the magnetic disk 2 causes air flow between the recording surface and the ABS 11S, and the magnetic head slider 4A floats from the magnetic disk 2 with a certain distance (magnetic spacing) in between with use of lift force caused by the air flow.

The magnetic read write head 10 is provided on one side surface (an element forming surface 11A) orthogonal to the ABS 11S, of the magnetic head slider 4A. Incidentally, on a surface 11B opposite to the ABS 11S of the slider 11, a light source unit 50 is provided corresponding to a position of the magnetic read write head 10.

[2. Structure of Magnetic Read Write Head]

Next, the structure of the magnetic read write head 10 using the thermally-assisted magnetic recording head according to the embodiment of the invention will be described with reference to FIG. 3 to FIG. 6. Note that FIG. 3 also illustrates the light source unit 50 used together with the magnetic read write head 10 at the time of recording.

Figure 3:
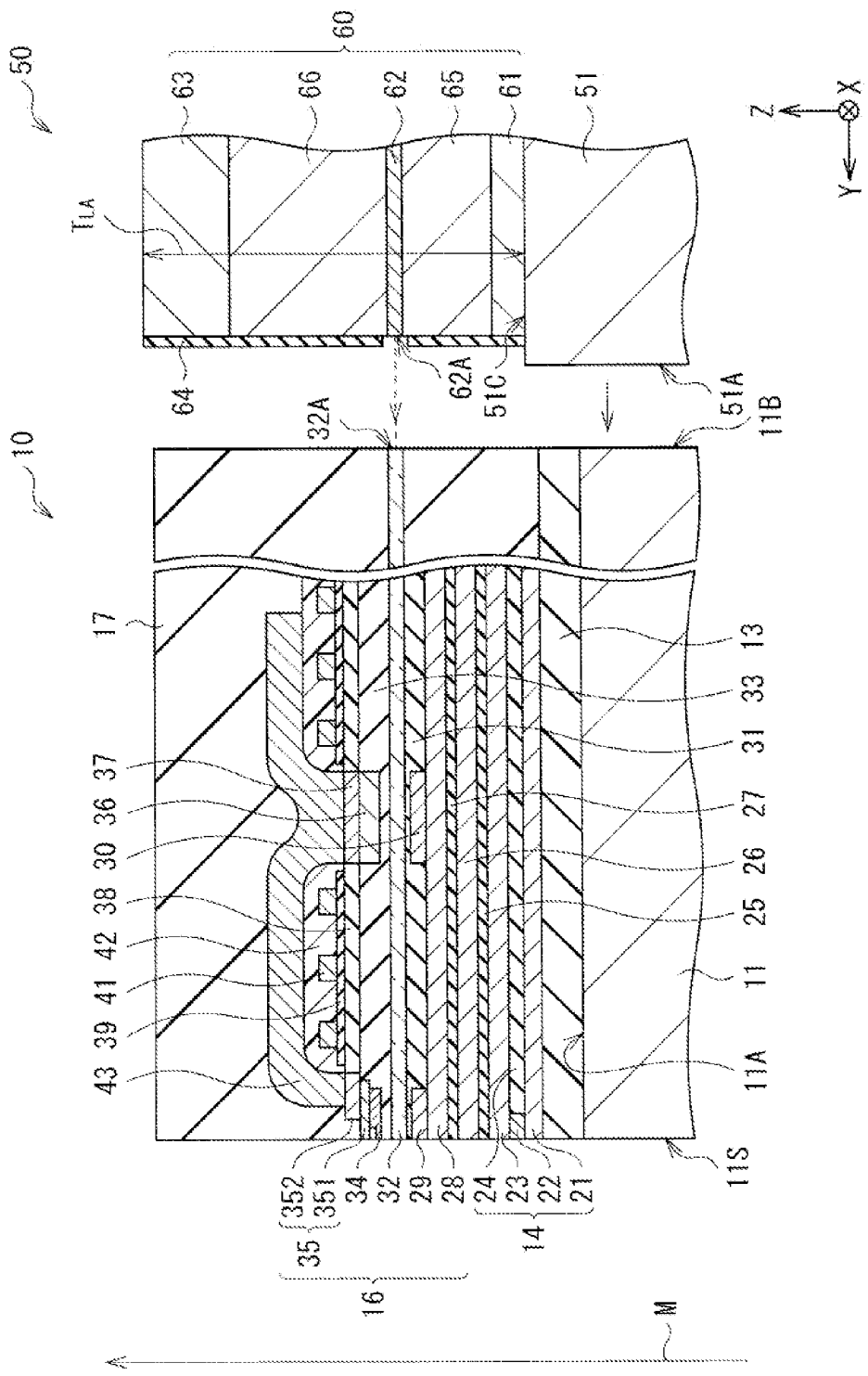
FIG. 3 is a sectional view of an YZ surface of a magnetic read write head using the thermally-assisted magnetic recording head according to the embodiment of the invention.
Figure 4:
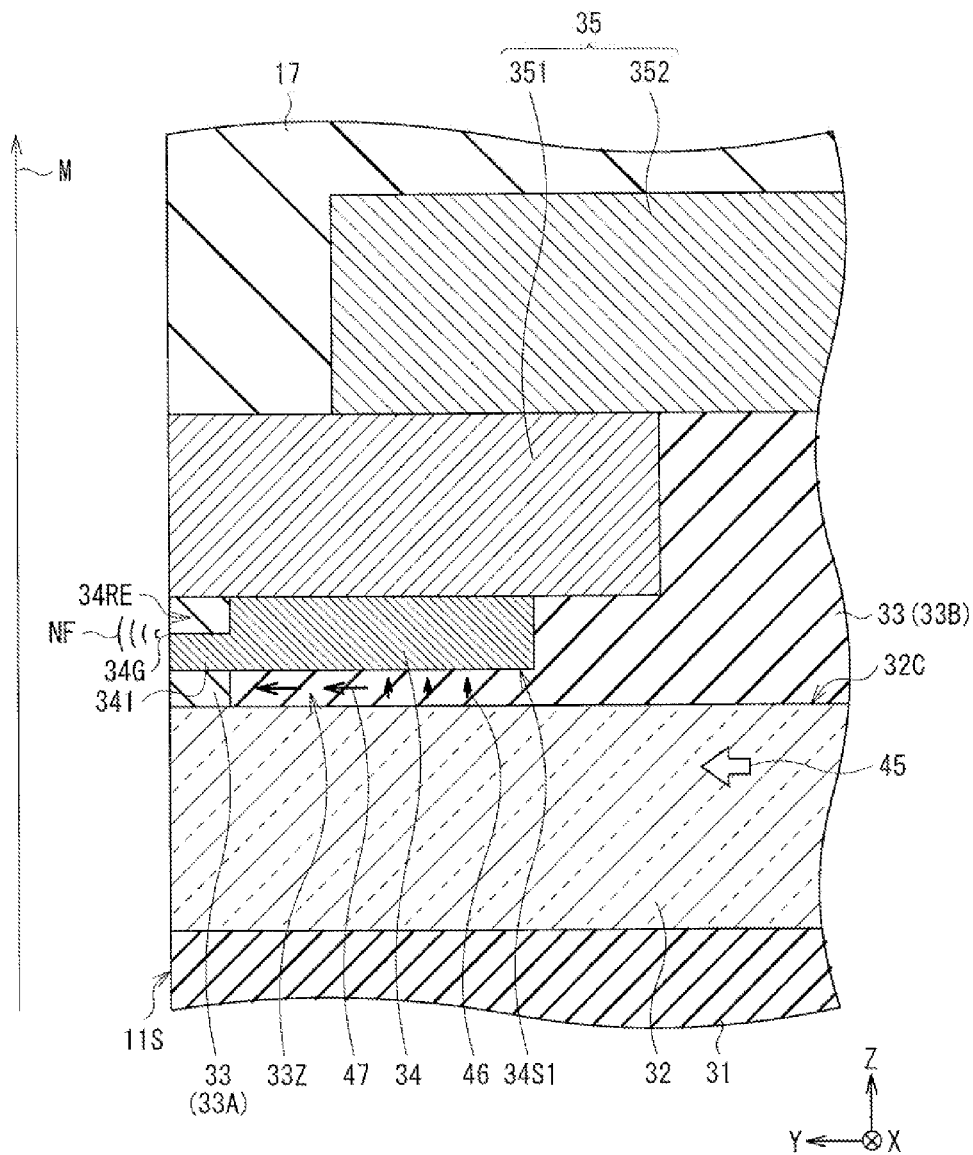
FIG. 4 is a sectional view illustrating a part of the magnetic read write head illustrated in FIG. 3 in an enlarged manner.
Figure 5:
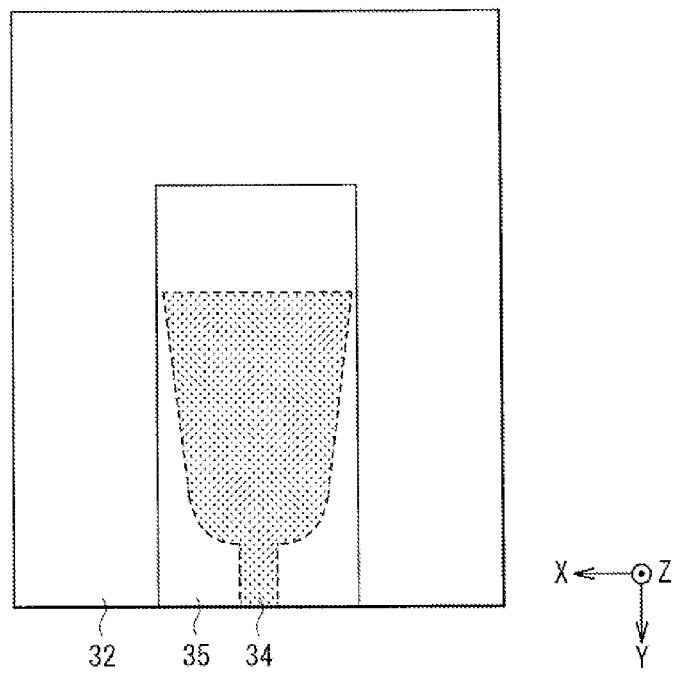
FIG. 5 is a plan view illustrating a structure of a waveguide, a PG, and a magnetic pole illustrated in FIG. 3.
Figure 6:
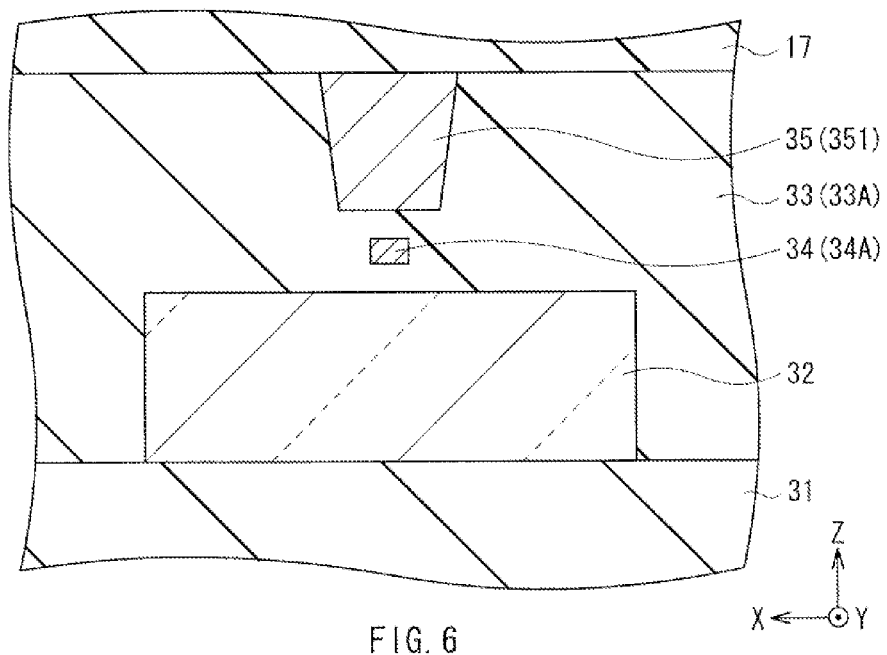
FIG. 6 is a sectional view of an XZ surface of the magnetic read write head illustrated in FIG. 3.

FIG. 3 illustrates a cross-sectional structure of the YZ surface of the magnetic read write head 10 illustrated in FIG. 2, and FIG. 4 illustrates a part of the magnetic read write head 10 illustrated in FIG. 3 in an enlarged manner. FIG. 5 illustrates a planar structure of a waveguide 32, a plasmon generator (PG) 34, and a magnetic pole 35 illustrated in FIG. 3. FIG. 6 illustrates a cross-sectional structure of the XZ surface of the magnetic read write head 10. Note that an up-arrow M illustrated in FIG. 3 and FIG. 4 indicates a direction in which the magnetic disk 2 moves relative to the magnetic read write head 10.

The definition related to dimensions, directions, and the like are as follows. Dimensions in the X-axis direction, the Y-axis direction, and the Z-axis direction are referred to as a "width", a "height" or a "length", and a "thickness", respectively. A closer side and a farther side to/from the ABS 11S in the Y-axis direction are referred to as "forward" and "backward", respectively. Front and rear in the direction of the arrow M are referred to as a "trailing side" and a "leading side", respectively. The X-axis direction and the Y-axis direction are referred to as a "cross track direction" and a "down track direction", respectively.

The magnetic read write head 10 described here is a magnetic head performing magnetic processing on the magnetic disk 2 (see FIG. 1), and is a composite head capable of performing both of a writing process and a reading process, for example.

As illustrated in FIG. 3, for example, the magnetic read write head 10 is formed on the slider 11, and has the ABS 11S. More specifically, the magnetic read write head 10 has a structure in which an insulating layer 13, a read head section 14, an insulating layer 25, an intermediate shield layer 26, an insulating layer 27, a write head section 16, and a protective layer 17 are stacked in this order. Note that the light source unit 50 is disposed at backward of the magnetic read write head 10.

The read head section 14 uses magneto-resistive effect (MR) to perform a reading process. For example, the read head section 14 has a structure in which a lower read shield layer 21, a shield gap 24, and an upper read shield layer 23 are stacked in this order. A read element (an MR element 22) is embedded in the shield gap layer 24 so that one end surface of the read element is exposed on the ABS 11S.

Each of the lower read shield layer 21 and the upper read shield layer 23 extends backward from the ABS 11S, and is formed of, for example, a magnetic material such as nickel iron alloy (NiFe). Examples of the nickel iron alloy include Permalloy ($Ni_{80}Fe_{20}$: trade name) containing nickel of 80 wt % and iron of 20 wt %.

The shield gap layer 24 is formed of one or more kinds of insulating materials such as aluminum oxide ($Al_2O_3$), aluminum nitride (AlN), silicon dioxide ($SiO_2$), and Diamond-Like Carbon (DLC).

The MR element 22 uses giant magneto-resistive effect (GMR), tunneling magneto-resistive effect (TMR), or the like to perform the reading process.

The insulating layers 25 and 27 are formed of the similar material to that of the shield gap layer 24, for example. The intermediate shield layer 26 prevents magnetic field generated in the write head section 16 from reaching the MR element 22, and is formed of, for example, a magnetic material such as nickel iron alloy.

The write head section 16 is a thermally-assisted magnetic write head performing a writing process of thermally-assisted magnetic recording system. For example, the write head section 16 has a structure in which a lower yoke layer 28, a leading shield 29 and a connecting layer 30, a cladding layer 31, the waveguide 32, a PG cladding layer 33, the PG 34 and a connecting layer 36, the magnetic pole 35, a connecting layer 37 and an insulating layer 38, insulating layers 39 and 42 and a coil 41, and an upper yoke layer 43 are stacked in this order. Incidentally, the leading shield 29 may be omitted from the structure.

The lower yoke layer 28 extends backward from the ABS 11S, and is formed of, for example, a magnetic material such as nickel iron alloy.

The leading shield 29 is located in the vicinity of the ABS 11S so that one end surface thereof is exposed on the ABS 11S. The connecting layer 30 is disposed at backward of the ABS 11S so as to be distanced from the leading shield 29. The leading shield 29 and the connecting layer 30 are each formed of, for example, a magnetic material such as nickel iron alloy.

The cladding layer 31 is formed of a dielectric material having a refractive index to laser light smaller than that of the waveguide 32. The dielectric material is formed of a material essentially containing one or more kinds of, for example, silicon oxide ($SiO_x$), aluminum oxide ($Al_2O_3$), aluminum nitride (AlN), beryllium oxide (BeO), silicon carbide (SiC), and DLC. "A material essentially containing" means a material containing the above-described materials as main components, and the same applies to the following description.

The waveguide 32 extends backward from the ABS 11S, and allows laser light emitted from an LD 60 described later to propagate to the ABS 11S. For example, one end surface of the waveguide 32 is exposed on the ABS 11S at the forward thereof, and the other end surface is exposed at backward thereof. Note that the forward end surface of the waveguide 32 may be located at a position receded from the ABS 11S without being exposed on the ABS 11S.

The waveguide 32 is formed of a dielectric material allowing laser light to pass therethrough. The dielectric material is a material essentially containing one or more kinds of, for example, silicon oxide (SiC), DLC, titanium oxide ($TiO_x$), tantalum oxide ($TaO_x$), silicon nitride ($SiN_x$), silicon oxynitride ($SiO_xN_y$), silicon (Si), zinc selenide (ZnSe), niobium oxide ($NbO_x$), gallium phosphide (GaP), zinc sulfide (ZnS), zinc telluride (ZnTe), chromium oxide ($CrO_x$), iron oxide ($FeO_x$), copper oxide ($CuO_x$), strontium titanate ($SrTiO_x$), barium titanate ($BaTiO_x$), germanium (Ge), and diamond (C). The dielectric material may contain other materials having a refractive index higher than that of the cladding layer 31 and the PG cladding layer 33 as subcomponents (for example, impurity).

Incidentally, the cross-sectional shape of the waveguide 32 parallel to the ABS 11S is a rectangle as illustrated in FIG. 6, for example. However, the cross-sectional shape of the waveguide 32 may be a shape other than the rectangle. For example, as illustrated in FIG. 5, the waveguide 32 has a width larger than that of the PG 34 and the magnetic pole 35.

The PG 34 generates near-field light NF in the vicinity of the ABS 11S based on the laser light propagating through the waveguide 32. The PG 34 is disposed between the waveguide 32 and the magnetic pole 35, and extends backward from the ABS 11S. A recessed section 34RE is provided above the forward of the PG 34 so that a part of the PG 34 is receded from the ABS 11S by a predetermined length, for example. Accordingly, the forward section of the PG 34 is surrounded by the PG cladding layer 33, and is distanced from the waveguide 32 and the magnetic pole 35 with the PG cladding layer 33 in between.

The PG 34 is formed of, for example, a conductive material such as a metal material. The metal material is one or more kinds of, for example, palladium (Pd), platinum (Pt), rhodium (Rh), iridium (Ir), ruthenium (Ru), gold (Au), silver (Ag), copper (Cu), and aluminum (Al). Among them, one or more kinds of gold, silver, copper, and aluminum are preferable.

The cross-sectional shape of the PG 34 parallel to the ABS 115 is a rectangle as illustrated in FIG. 6, for example. Incidentally, the cross-sectional shape of the PG 34 may be a shape other than the rectangle. For example, as illustrated in FIG. 5, the PG 34 has a width smaller than that of the waveguide 32 and the magnetic pole 35. Note that the detailed structure of the PG 34 will be described later.

The PG cladding layer 33 is provided between the waveguide 32 and the magnetic pole 35, and allows the PG 34 to be embedded therein. Incidentally, the detailed structure of the PG cladding layer 33 will be described later.

The magnetic pole 35 contains therein magnetic flux generated in the coil 41, and releases the magnetic flux from the ABS 11S to generate recording magnetic field. For example, the magnetic pole 35 has a structure in which a lower layer 351 and an upper layer 352 are stacked in this order. The lower layer 351 extends backward from the ABS 11S. The upper layer 352 extends backward from a position receded from the ABS 11S, for example, and a backward end of the upper layer 352 is located behind the backward end of the lower layer 351. Note that surroundings of the lower layer 351 are embedded together with the PG 34 by the PG cladding layer 33, for example.

The lower layer 351 and the upper layer 352 are formed of, for example, a magnetic material with high saturation flux density such as iron-based alloy. The iron-based alloy is one or more kinds of, for example, iron cobalt alloy (FeCo), iron nickel alloy (FeNi), and iron cobalt nickel alloy (FeCoNi).

Incidentally, a cross-sectional shape of the lower layer 351 parallel to the ABS 11S is a shape (an inverted trapezoid) in which a width of a trailing edge (an upper end) is larger than a width of a leading edge (a lower end), for example, as illustrated in FIG. 6. However, the cross-sectional shape of the lower layer 351 may be a shape other than the inverted trapezoid.

The connecting layer 36 is disposed at backward of the PG 34 and the magnetic pole 35, and is distanced from the PG 34 and the magnetic pole 35. The connecting layer 36 is located above the connecting layer 30 and surroundings thereof are embedded by the PG cladding layer 33. The connecting layer 37 is adjacent to an upper surface of the connecting layer 36, and is distanced from the magnetic pole 35 similarly to the connecting layer 36. The connecting layers 36 and 37 are each formed of, for example, a material similar to that of the connecting layer 30. The surroundings of the upper layer 352 and the connecting layer 37 are embedded by the insulating layer 38, for example.

The insulating layer 38 is formed of, for example, one or more kinds of insulating materials such as aluminum oxide ($Al_2O_3$), aluminum nitride (AlN), silicon oxide ($SiO_x$), and DLC.

The coil 41 generates recording-use magnetic flux in response to a write current. The coil 41 is disposed on the insulating layer 39, and is formed of, for example, one or more kinds of high conductive materials such as copper (Cu) and gold (Au). The coil 41 and the insulating layer 39 are covered with the insulating layer 42. The insulating layer 39 is formed of, for example, a material similar to that of the insulating layer 38. The insulating layer 42 is formed of, for example, one or more kinds of non-magnetic insulating materials showing fluidity during being heated, such as a photoresist and a Spin On Glass (SOG).

The upper yoke layer 43 extends backward from a position receded from the ABS 11S while covering the insulating layer 42, and is connected to the magnetic pole 35 (the upper layer 352) at the forward thereof and is connected to the connecting layer 37 at the backward thereof. The upper yoke layer 43 is formed of, for example, one or more kinds of soft magnetic materials with high saturation flux density such as cobalt iron alloy CoFe.

In the write head section 16, a magnetic path is formed mainly by the leading shield 29, the lower yoke layer 28, the connecting layers 30, 36, and 37, the upper yoke layer 43, and the magnetic pole 35, and when a write current flows through the coil 41, magnetic flux is generated in the magnetic path. Accordingly, a recording magnetic field is generated in the vicinity of the ABS 11S in the magnetic pole 35, and the recording magnetic field is supplied to the magnetic disk 2.

The protective layer 17 covers the write head section 16, and is formed of, for example, a material similar to that of the cladding layer 31. Note that the protective layer 17 and the PG cladding layer 33 each have a lower refractive index and higher thermal conductivity compared with the waveguide 32. Accordingly, the waveguide 32, the PG 34, and the magnetic pole 35 are surrounded by dielectric materials (the protective layer 17 and the PG cladding layer 33).

[3. Structure of Light Source Unit]

Next, the structure of the light source unit 50 will be described with reference to FIG. 3.

The light source unit 50 includes the Laser Diode (LD) 60 and a supporting member 51 supporting the LD 60.

The supporting member 51 is formed of, for example, a ceramic material such as AlTiC ($Al_2O_3 \cdot TiC$), and is a substantially rectangular parallelepiped. The supporting member 51 includes a bonded surface 51A to be bonded to a back surface 11B of the slider 11, and a light source mounting surface 51C that is orthogonal to the bonded surface 51A and is parallel to the element forming surface 11A. Note that the supporting member 51 desirably has a function of a heatsink dissipating heat generated by the LD 60, in addition to the function to support the LD 60.

The LD 60 is a light source emitting laser right, and is formed on the light source mounting surface 51C of the supporting member 51. A thickness $T_{LA}$ of the LD 60 is, for example, 60 μm to 200 μm both inclusive. Incidentally, series and intended use of the LD 60 are not particularly limited. For example, the series thereof may be of InP-based, GaAs-based, GaN-based, or the like, and the intended use thereof may be for communication, for optical disk storage, for material analysis, or the like. Although the wavelength of the laser light is not particularly limited, is for example, 375 nm to 1.7 μm both inclusive. The specific type of the LD 60 is, for example, a laser diode of InGaAsP/InP quaternary mixed crystal with the emission wavelength region of 1.2 to 1.67 μm both inclusive.

For example, the LD 60 has a structure in which a lower electrode 61, an n-type semiconductor layer 65, an active layer 62, a p-type semiconductor layer 66, and an upper electrode 63 are stacked in this order. The n-type semiconductor layer 65 includes, for example, n-type AlGaN, and the p-type semiconductor layer 66 includes, for example, p-type AlGaN.

On each of two cleavage surfaces of the stacked structure of the LD 60, a reflective layer 64 for exciting oscillation using light reflection is provided, and the reflective layer 64 is formed of, for example, silicon oxide ($SiO_2$) or aluminum oxide ($Al_2O_3$). Incidentally, in the reflective layer 64, an opening for emitting laser light is provided at a position including an emission center 62A of the active layer 62.

The magnetic read write head 10 and the light source unit 50 are positioned by bonding the bonded surface 51A of the supporting member 51 to the back surface 11B of the slider 11 in such a manner that the position of the emission center 62A and the position of the backward end surface 32A of the waveguide 32 are coincident with each other. Accordingly, when a predetermined voltage is applied between the lower electrode 61 and the upper electrode 63 and laser light is emitted from the emission center 62A of the active layer 62, the laser light enters the waveguide 32 through the backward end surface 32A.

Incidentally, the laser light emitted from the LD 60 is preferably polarized light of a TM mode. The polarized light of the TM mode is polarized light whose electric field oscillates in a direction perpendicular to the surface of the active layer 62. A power source in the magnetic recording unit is allowed to be used to drive the LD 60, and the magnetic recording unit includes, for example, a power source capable of generating a voltage of about 2 V. The laser diode 60 consumes power of, for example, about several tens mW.

[4. Structure of Main Part of Magnetic Read Write Head]

Figure 7:
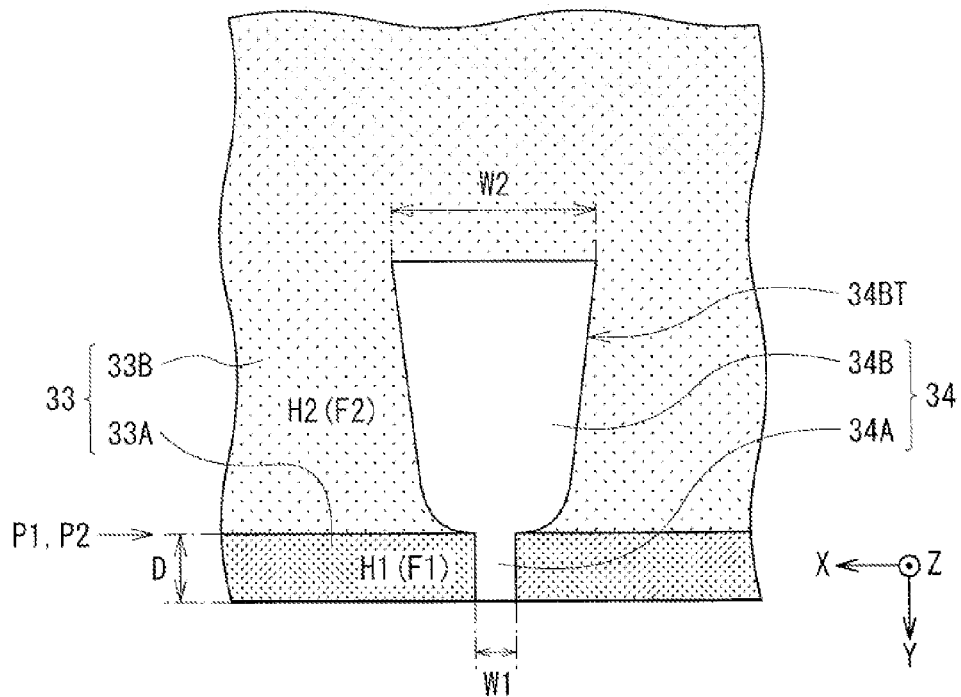
FIG. 7 is a plan view illustrating a structure of the PG and a PG cladding layer illustrated in FIG. 3.
Figure 8:
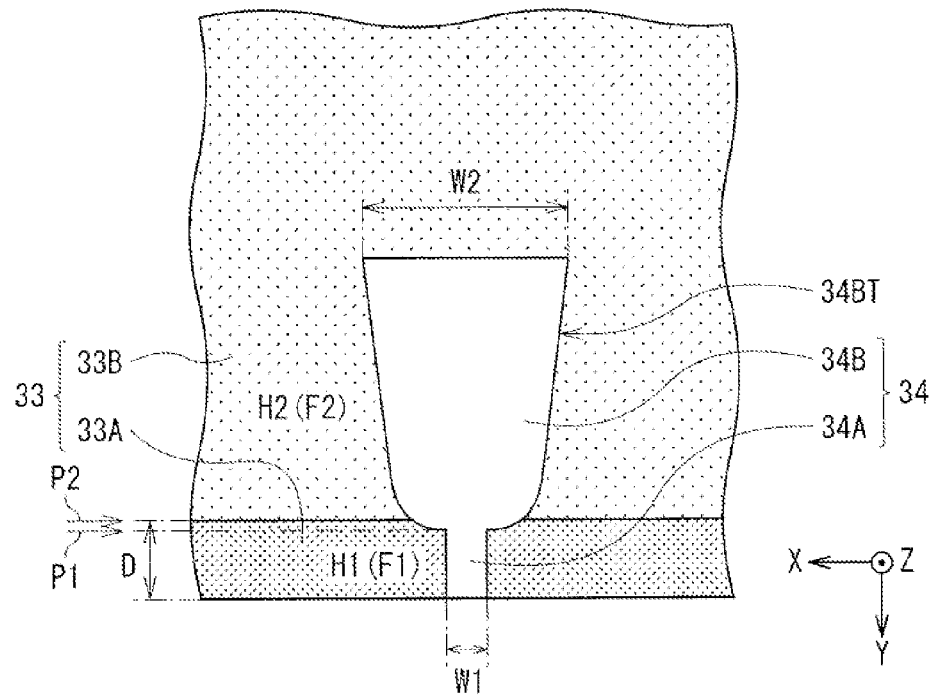
FIG. 8 is a plan view illustrating another structure of the PG and the PG cladding layer illustrated in FIG. 3.

The detailed structure of the PG 34 and the PG cladding layer 33 is described now with reference to FIG. 3, FIG. 7, and FIG. 8. FIG. 7 and FIG. 8 each illustrate a planar structure of the PG 34 and the PG cladding layer 33 as viewed from the Z-axis direction (above).

For example, as illustrated in FIG. 7, the PG 34 disposed in a region between the waveguide 32 and the magnetic pole 35 includes two sections (a first PG section 34A and a second PG section 34B) with different widths.

The first PG section 34A is located on a side close to the ABS 11S, and more specifically, for example, extends backward from the ABS 11S. For example, the first PG section 34A has a constant width W1, and thus the planar shape of the first PG section 34A is, for example, a rectangle.

The second PG section 34B is located on a side far from the ABS 11S, and more specifically, for example, extends backward from a position receded from the ABS 11S and is coupled with the first PG section 34A. Note that the first PG section 34A and the second PG section 34B may be integrated or separated. "Integrated" means that the first PG section 34A and the second PG section 34B are formed in a single process to be one part. In contrast, "separated" means that the first PG section 34A and the second PG section 34B are formed in different processes to be two parts.

For example, the second PG section 34B has, for example, a width W2 larger than the width W1 of the first PG section 34A, and the width W2 is gradually increased backward from a forward end position of the second PG section 34B. The planar shape of the second PG section 34B is not particularly limited. Specifically, FIG. 7 illustrates a case where a side edge 34BT of the second PG section 34B is a convex curve at forward side and is a straight line at the backward side, however, this is not limitative. For example, a backward edge 34BT may be a straight line over all.

A backward end position defining an extending length of the first PG section 34A, namely, a coupling position P1 of the first PG section 34A and the second PG section 34B is not particularly limited as long as being located at backward of the ABS 11S.

As illustrated in FIG. 7, the PG cladding layer 33 in which the PG 34 is embedded in the region between the waveguide 32 and the magnetic pole 35 includes two sections (a first cladding section 33A and a second cladding section 33B) with different physical properties.

The first cladding section 33A is located on a side close to the ABS 11S, and more specifically, for example, extends backward from the ABS 11S. The first cladding section 33A is formed of a dielectric material having a thermal expansion coefficient H1 larger than a thermal expansion coefficient of the second cladding section 33B.

The second cladding section 33B is located on a side far from the ABS 11S, and more specifically, for example, extends backward from a position receded from the ABS 11S and is coupled with the first cladding section 33A. The second cladding section 33B is formed of a dielectric material having a thermal expansion coefficient H2 smaller than the thermal expansion coefficient of the first cladding section 33A.

Specifically, as for the physical properties of the first cladding section 33A and the second cladding section 33B described above, the thermal expansion coefficient H1 of the first cladding section 33A is larger than the thermal expansion coefficient H2 of the second cladding section 33B. In other words, a compression stress F1 of the first cladding section 33A is smaller than a compression stress F2 of the second cladding section 33B at the time of the PG cladding layer 33 being heated (at the time of thermal expansion). Since stress applied to the PG 34 is relatively larger at a forward section 341 than at a backward section during operation of the magnetic read write head 10, agglomeration (heat shrinkage) is less likely to occur at 341 near the ABS 11S. As a result, even when the stress is applied to the PG 34, recording operation is stabilized because the PG 34 is less likely to be receded from the ABS 11S.

To examine magnitude relationship between the thermal expansion coefficient H1 of the first cladding section 33A and the thermal expansion coefficient H2 of the second cladding section 33B, for example, it is sufficient to compare thermal expansibility associated with temperature change to determine which is more thermally expanded between the first cladding section 33A and the second cladding section 33B. Specifically, for example, first, the first cladding section 33A and the second cladding section 33B are separated from the magnetic read write head 10 with use of Focused Ion Beam (FIB) or the like. Subsequently, the thickness of each of the first cladding section 33A and the second cladding section 33B at room temperature is measured with use of Atomic Force Microscope (AFM) or the like. Finally, after the first cladding section 33A and the second cladding section 3B are heated, the thicknesses are measured again with use of the AFM or the like. Conditions of heating temperature, heating time, and the like may be arbitrarily set. The thickness of each of the first cladding section 33A and the second cladding section 33B is supposed to be increased due to thermal expansion at high temperature. Therefore, it is possible to determine which is more expanded, in other words, which has a larger thermal expansion coefficient, by examining which has a larger increased amount of the thickness.

The material of the first cladding section 33A and the material of the second cladding section 33B may be the same kind or different kinds as long as the above-described conditions of the physical properties are satisfied. Especially, the material of the first cladding section 33A and the material of the second cladding section 33B are preferably different from each other. This is because the thermal expansion coefficients typically differ depending on kinds of the materials, and therefore the above-described conditions of the physical properties relating to the thermal expansion coefficient are easily satisfied.

The material of the first cladding section 33A is not particularly limited as long as the material is one or more kinds of dielectric materials having the thermal expansion coefficient H1 larger than the thermal expansion coefficient of the second cladding section 33B. The dielectric material is one or more kinds of magnesium oxide (MgO), zirconium oxide ($ZrO_2$), and the like.

The material of the second cladding section 33B is not particularly limited as long as the material is one or more kinds of dielectric materials having the thermal expansion coefficient H2 smaller than the thermal expansion coefficient of the first cladding section 33A. The dielectric material is one or more kinds of silicon oxide ($SiO_x$), aluminum oxide ($Al_2O_3$), silicon oxynitride ($SiO_xN_y$), and the like. Note that the specific composition (the value of x) of the silicon oxide ($SiO_x$) is not particularly limited, however, for example, x satisfies $0<x\leq2$. The specific example of silicon oxide is $SiO_2$ and the like. In addition, the specific composition (the values of x and y) of silicon oxynitride ($SiO_xN_y$) is not particularly limited, however, for example, x satisfies $0\leq x<1.34$ and y satisfies $0<y<1.34$.

Here, the backward end position defining an extending length D of the first cladding section 33A, in other words, a coupling position P2 of the first cladding section 33A and the second cladding section 33B is not particularly limited as long as being located at backward of the ABS 11S. This is because when the first cladding section 33A (having the large thermal expansion coefficient H1) is located on a closer side to the ABS 11S as compared with the second cladding section 33B (having the small thermal expansion coefficient H2), the forward section 341 of the PG 34 is less likely to be agglomerated without depending on the above-described coupling position P2.

For example, as illustrated in FIG. 7, the coupling position P2 may be substantially coincident with the coupling position P1, or as illustrated in FIG. 8, may be located at backward of the coupling position P1. This is because the volume of the first PG section 34A is small relative to the volume of the second PG section 34B due to the difference between the widths W1 and W2 (W1<W2), and thus the first PG section 34A is easily exposed to high pressure environment as compared with the second PG section 34B. Further, this is because the temperature is increased as the location is closer to the forward end of the PG 34. When the coupling position P2 is coincident with the coupling position P1 or is located at backward of the coupling position P1, the first PG section 34A is surrounded by the first cladding section 33A, and therefore the first PG section 34A is difficult to be agglomerated.

In particular, the coupling position P2 is preferably located at backward of the coupling position P1. This is because the stress tends to be concentrated at the section near the coupling position P1 of the PG 34 due to difference between the volume of the first PG section 34A and the volume of the second PG section 34B. When the coupling position P2 is located at backward of the coupling position P1, the section near the coupling position P1 of the PG 34 is surrounded by the first cladding section 33A, and thus the stress is difficult to be applied to the section.

The extending length D of the first cladding section 33A, in other words, the distance from the ABS 11S to the backward end (the coupling position P1) of the first cladding section 33A is not particularly limited, however is preferably about 50 nm or more without depending on the above-described coupling position P1. This is because, during the operation of the magnetic read write head 10, the temperature tends to be high particularly in a region where the distance from the ABS 11S is 50 nm or less, and thus agglomeration easily occur.

In particular, the extending length D is preferably about 50 nm to about 100 nm both inclusive. This is because, in a region where the distance from the ABS 11S exceeds about 100 nm, the temperature is less likely to be increased even during the operation of the magnetic read write head 10, and therefore agglomeration is less likely to occur.

Note that, as illustrated in FIG. 6, in the vicinity of the ABS 11S, the PG 34 (the first PG section 33A) is surrounded on four sides (in top, bottom, left, and right directions) by the PG cladding layer 33 (the first cladding section 33A). In this case, out of four sections located on the four sides (top section, bottom section, left section, and right section), it is sufficient for one or more sections to have the thermal expansion coefficient H1 larger than the thermal expansion coefficient of the second cladding section 33B. This is because, although some variation may occur, when one or more sections have the large thermal expansion coefficient H1, the forward section 341 of the PG 34 is less likely to be agglomerated.

In particular, considering balance of the stress applied to the forward section 341 of the PG 34, the section having the large thermal expansion coefficient H1 is preferably a combination of the top section and the bottom section or a combination of the left section and the right section, and is more preferably a combination of the top section and the bottom section. Obviously, a combination of all the top section, the bottom section, the left section, and the right section is particularly preferable.

[5. Circuit Configuration and Operation of Magnetic Recording Unit]

Figure 9:
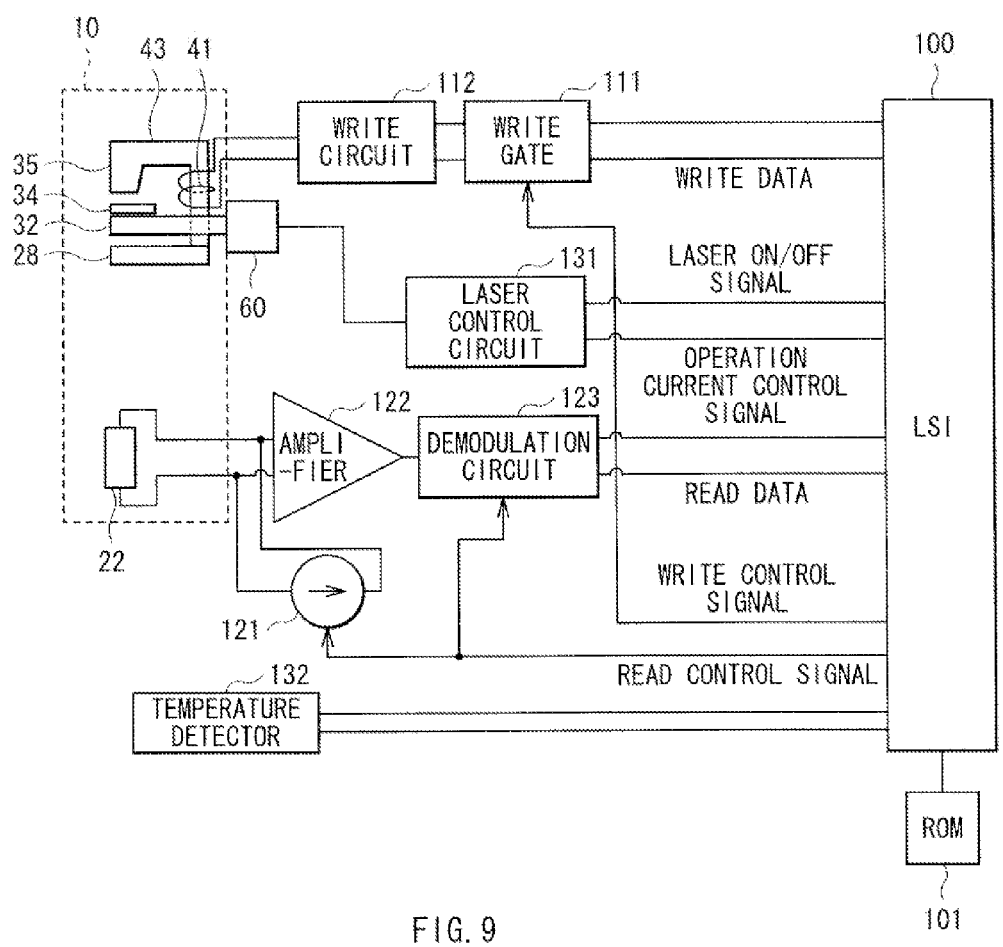
FIG. 9 is a block diagram illustrating a circuit configuration of the magnetic recording unit illustrated in FIG. 1.

With reference to FIG. 4 and FIG. 9, the circuit configuration of the magnetic recording unit and the operation of the magnetic read write head 10 will be described below. FIG. 9 illustrates a circuit configuration of a control circuit of the magnetic recording unit illustrated in FIG. 1.

The control circuit of the magnetic recording unit includes a control LSI (large-scale integration) 100, a ROM (read only memory) 101 connected to the control LSI 100, a write gate 111 connected to the control LSI 100, a write circuit 112 connecting the write gate 111 to the coil 41, a constant current circuit 121 connected to the MR element 22 and the control LSI 100, an amplifier 122 connected to the MR element 22, a demodulation circuit 123 connected to the amplifier 122 and the control LSI 100, a laser control circuit 131 connected to the LD 60 and the control LSI 100, and a temperature detector 132 connected to the control LSI 100.

The control LSI 100 provides write data and a write control signal to the write gate 111. Moreover, the control LSI 100 transmits a read control signal to the constant current circuit 121 and the demodulation circuit 123, and receives read data from the demodulation circuit 123. In addition, the control LSI 100 transmits a laser ON/OFF signal and an operation current control signal to the laser control circuit 131.

The temperature detector 132 detects the temperature of the magnetic disk 2 to supply information of the temperature to the control LSI 100. The temperature of the magnetic disk 2 is the temperature of the magnetic recording layer having a recording region.

The ROM 101 holds information such as a control table to control an operation current to be supplied to the LD 60.

At the time of write operation, the control LSI 100 supplies the write data to the write gate 111. The write gate 111 supplies the write data to the write circuit 112 only when the write control signal instructs to perform the write operation. The write circuit 112 supplies the write current to the coil 41 according to the write data. As a result, a write magnetic field is generated from the magnetic pole 35, and information is recorded into the magnetic recording layer of the magnetic disk 2 by the write magnetic field.

At the time of read operation, the constant current circuit 121 supplies a constant sense current to the MR element 22 only when the read control signal instructs to perform the read operation. The output voltage of the MR element 22 is amplified by the amplifier 122, and is then received by the demodulation circuit 123. The demodulation circuit 123 demodulates the output of the amplifier 122 to generate read data and supplies the read data to the control LSI 100 when the read control signal instructs to perform the read operation.

The laser control circuit 131 controls the supply of the operation current to the LD 60 based on the laser ON/OFF signal, and controls the operation current to be supplied to the LD 60 based on the operation current control signal. The laser control circuit 131 supplies the operation current equal to or larger than an oscillation threshold to the LD 60 when the laser ON/OFF signal instructs to perform the ON operation. As a result, the laser light is emitted from the LD 60 and then the laser light propagates through the waveguide 32, and thus the near-field light NF is generated from a tip section 34G of the PG 34. A part (the recording region) of the magnetic recording layer of the magnetic disk 2 is heated by the near-field light NF, and thus the coercivity of the recording region is lowered. At the time of recording, information is recorded into the recording region with lowered coercivity by the recording magnetic field.

The control LSI 100 determines a value of the operation current of the LD 60 with reference to the control table stored in the ROM 101, based on the temperature of the magnetic disk 2 measured by the temperature detector 132 and the like. In addition, the control LSI 100 controls the laser control circuit 131 with use of the operation current control signal in such a manner that the desired operation current is supplied to the LD 60.

The control table includes, for example, data such as the oscillation threshold of the LD 60 and temperature dependency of light output-operation current property. Besides this, the control table may include data indicating a relationship between the operation current value and the increased amount of the temperature of the magnetic recording layer heated by the near-field light NF, data indicating temperature dependency of the coercivity of the magnetic recording layer, and the like.

The control circuit has a signal system to control the LD 60, that is, signals such as the laser ON/OFF signal and the operation current control signal, independent of the control signal system of write-read operation. Therefore, more various conduction modes to the LD 60 are achievable, in addition to the conduction mode simply operated in conjunction with the write operation.

Note that the circuit configuration of the control circuit of the magnetic recording unit is not limited to the circuit configuration illustrated in FIG. 9.

[6. Generation Principle of Near-Field Light and Recording Principle of Thermally-Assisted Magnetic Recording]

Subsequently, a generation principle of the near-field light NF and a recording principle of the thermally-assisted magnetic recording with use of the near-field light NF will be described with reference to FIG. 1, FIG. 3, and FIG. 4.

When laser light 45 is emitted from the LD 60, the laser light 45 propagates through the waveguide 32 to reach near the PG 34. Accordingly, the laser light 45 is totally reflected by an interface (an evanescent light generating surface 32C) between the waveguide 32 and a buffer section 33Z of the PG cladding layer 33, and therefore evanescent light 46 is leaked into the inside of the buffer section 33Z. The "buffer section 33Z" is a section located between the waveguide 32 and the PG 34 in the PG cladding layer 33. Subsequently, the evanescent light 46 couples with charge fluctuation on a surface (a surface plasmon exciting surface 34S1) of the PG 34 facing the waveguide 32, to induce a surface plasmon polariton mode. As a result, surface plasmons 47 are excited on the surface plasmon exciting surface 34S1. The surface plasmons 47 propagate on the surface plasmon exciting surface 341 toward the ABS 11S.

The surface plasmons 47 eventually reach the ABS 11S, and as a result, the near-field light NF is generated on the tip section 34G of the PG 34. When being irradiated toward the magnetic disk 2, the near-field light NF heats a part (the recording region) of the magnetic recording layer, and therefore, the coercivity is lowered in the recording region. Since the write magnetic field generated by the magnetic pole 35 is applied to the recording region with the lowered coercivity, information is recorded in the recording region by the recording magnetic field.

[7. Function and Effects]

In the magnetic read write head 10, the PG cladding layer 33 in which the PG 34 is embedded includes the first cladding section 33A located on a side close to the ABS 11S and the second cladding section 33B located on a side far from the ABS 11S. The thermal expansion coefficient H1 of the first cladding section 33A is larger than the thermal expansion coefficient H2 of the second cladding section 33B.

In this case, as described above, at the time of recording, since the stress applied to the PG 34 is relatively small at the forward section 341 as compared with at the backward section, the forward section 341 close to the ABS 11S is less likely to be agglomerated. Accordingly, the PG 34 is less likely to be receded from the ABS 11S even if the stress is applied, and thus the recording operation is stabilized. Consequently, the agglomeration of the PG 34 is suppressed, and thus superior recording property is obtainable.

In particular, when the material of the first cladding section 33A is different from the material of the second cladding section 33B, difference between the thermal expansion coefficients H1 and H2 easily occur, and thus higher effects are obtainable. In addition, when the backward end position (the coupling position P2) of the first cladding section 33A is coincident with the backward end position (the coupling position P1) of the first PG section 34A or is located at backward of the backward end position of the first PG section 34A, the agglomeration of the PG 34 is allowed to be effectively suppressed. Furthermore, when the extending length D of the first cladding section 33A is about 50 nm or more, preferably about 50 nm to about 100 nm both inclusive, the agglomeration of the PG 34 is allowed to be substantially suppressed.

Hereinbefore, although the invention has been described with reference to the embodiment, the invention is not limited to the above-described embodiment, and various modifications may be made. For example, the thermally-assisted magnetic recording head of the invention has been applied to a composite head, however may be applied to a write-only head not provided with a read head section.

Incidentally, the series of components of the thermally-assisted magnetic recording head of the invention, more specifically, the configurations (shapes, materials, positional relationships between components, etc.) of the waveguide, the plasmon generator, the magnetic pole, and the like are not limited to those described in the embodiment, and may be modified appropriately.

What is claimed is:

1. A thermally-assisted magnetic recording head, comprising:
   a waveguide;
   a magnetic pole;
   a cladding layer provided between the waveguide and the magnetic pole; and
   a plasmon generator embedded in the cladding layer, wherein
   the cladding layer includes a first cladding section located on a side close to an air-bearing surface and a second cladding section located on a side far from the air-bearing surface, and
   a thermal expansion coefficient of the first cladding section is larger than a thermal expansion coefficient of the second cladding section.

2. The thermally-assisted magnetic recording head according to claim 1, wherein a compression stress of the first cladding section is smaller than a compression stress of the second cladding section.

3. The thermally-assisted magnetic recording head according to claim 1, wherein a forming material of the first cladding section is different from a forming material of the second cladding section.

4. The thermally-assisted magnetic recording head according to claim 1, wherein the plasmon generator includes a metal material, and the cladding layer includes a dielectric material.

5. The thermally-assisted magnetic recording head according to claim 1, wherein the plasmon generator includes one or more of gold (Au), silver (Ag), copper (Cu), and aluminum (Al), the first cladding section includes magnesium oxide (MgO) or zirconium oxide ($ZrO_2$) or both, and the second cladding section includes one or more of silicon oxide ($SiO_x$), aluminum oxide ($Al_2O_3$), and silicon oxynitride ($SiO_xN_y$).

6. The thermally-assisted magnetic recording head according to claim 1, wherein the plasmon generator includes a first plasmon generator section located on the side close to the air-bearing surface, and a second plasmon generator section located on the side far from the air-bearing surface and having a width larger than a width of the first plasmon generator section, and a position of back end in the first cladding section is substantially coincident with a position of back end of the first plasmon generator section, or is located at backward of the position of back end in the first plasmon generator.

7. The thermally-assisted magnetic recording head according to claim 1, wherein the first cladding section extends backward from the air-bearing surface, and a distance from the air-bearing surface to a position of back end of the first cladding section is from about 50 nanometers to about 100 nanometers both inclusive.

8. A head gimbal assembly, comprising:

a magnetic head slider having a side surface, the side surface being provided with the thermally-assisted magnetic recording head according to claim 1; and a suspension having an end, the end being attached with the magnetic head slider.

9. A head arm assembly, comprising:

a magnetic head slider having a side surface, the side surface being provided with the thermally-assisted magnetic recording head according to claim 1;

a suspension having a first end and a second end, the first end being attached with the magnetic head slider; and an arm supporting the suspension at the second end thereof.

10. A magnetic recording unit provided with a magnetic recording medium and a head arm assembly, the head arm assembly comprising:

a magnetic head slider having a side surface, the side surface being provided with the thermally-assisted magnetic recording head according to claim 1;

a suspension having a first end and a second end, the first end being attached with the magnetic head slider; and an arm supporting the suspension at the second end thereof.

* * * * *